US005676787A

United States Patent [19]

Rusincovitch et al.

[11] Patent Number: 5,676,787

[45] Date of Patent: Oct. 14, 1997

[54] METHOD FOR MAKING REPOSITIONABLE WALL COVERING AND INTERMEDIATE FOR SAME

[75] Inventors: George Rusincovitch, Worthington; Lawrence Daniel Carstensen, Circleville, both of Ohio

[73] Assignee: Borden Decorative Products, Inc., Columbus, Ohio

[21] Appl. No.: 472,847

[22] Filed: Jun. 7, 1995

[51] Int. Cl.[6] .............................. B32B 31/08; B32B 7/04

[52] U.S. Cl. .............................. 156/277; 156/290; 428/201; 428/202

[58] Field of Search .............................. 156/189, 290, 156/292, 277; 428/201, 202, 317.1, 343

[56] References Cited

U.S. PATENT DOCUMENTS

| | | | |
|---|---|---|---|
| 3,301,741 | 1/1967 | Henrickson et al. | 161/119 |
| 3,314,838 | 4/1967 | Erwin | 156/71 |
| 3,331,729 | 7/1967 | Danielson et al. | 161/162 |
| 3,554,835 | 1/1971 | Morgan | 156/234 |
| 3,620,366 | 11/1971 | Parkinson et al. | 206/59 C |
| 3,663,269 | 5/1972 | Fischer et al. | 117/76 A |
| 3,857,731 | 12/1974 | Merrill, Jr. et al. | 117/122 PA |
| 4,054,697 | 10/1977 | Reed et al. | 428/40 |
| 4,376,151 | 3/1983 | Parrotta | 428/323 |
| 4,556,595 | 12/1985 | Ochi | 428/143 |
| 4,629,663 | 12/1986 | Brown et al. | 428/343 |
| 4,735,837 | 4/1988 | Miyasaka et al. | 428/40 |
| 4,822,670 | 4/1989 | Ono et al. | 428/317.3 |
| 4,983,664 | 1/1991 | Truskolaski et al. | 524/514 |
| 4,985,302 | 1/1991 | Sala et al. | 428/343 |
| 5,080,957 | 1/1992 | Leseman et al. | 428/167 |
| 5,108,811 | 4/1992 | Shippen | 428/40 |
| 5,141,790 | 8/1992 | Calhoun et al. | 428/40 |

FOREIGN PATENT DOCUMENTS

| | | | |
|---|---|---|---|
| 367651 | 5/1990 | European Pat. Off. . | |
| 479223A1 | 4/1992 | European Pat. Off. | B44C 1/17 |
| 609603A1 | 8/1994 | European Pat. Off. | D21H 27/20 |
| 61-115981 | 6/1986 | Japan . | |
| 2141946 | 1/1985 | United Kingdom . | |
| 9109725 | 7/1991 | WIPO . | |
| 9220534 | 11/1992 | WIPO . | |

OTHER PUBLICATIONS

Handbook of Adhesives, I. Skeist (editor) 2d Ed. (1977).

*Primary Examiner*—David A. Simmons
*Assistant Examiner*—J. A. Lorengo
*Attorney, Agent, or Firm*—Watson Cole Stevens Davis, P.L.L.C.

[57] ABSTRACT

Methods for making a sheet material, such as wall covering, having a decorative (front) surface and a working (back) surface, for application to a support surface are disclosed. One method includes applying a release layer over the decorative surface and printing a pattern over the release layer to cover portions of the release layer. A pressure sensitive adhesive layer is applied to the working surface. Upon rolling the sheet material into a roll, the pattern adheres to the pressure sensitive adhesive layer so that, upon unrolling, the release layer transfers to the pressure sensitive adhesive layer. Another method is disclosed which sequentially combines ink, adhesive and a decorative sheet with a release sheet. Intermediate products, namely the sheet material prior to rolling are also disclosed.

18 Claims, 5 Drawing Sheets

METHOD FOR MAKING REPOSITIONABLE WALL COVERING AND INTERMEDIATE FOR SAME

FIELD OF THE INVENTION

This invention relates to methods and intermediates for making a decorative sheet material for applying to a wall, ceiling, floor, kitchen unit, table or other surface within domestic or industrial premises or place of amenity. In a preferred embodiment, this invention relates to methods and intermediates for making wall coverings, such as wallpaper which utilize a pressure sensitive adhesive and a means, to minimize initial adhesion of the wall covering to a wall. Maximum adhesion is subsequently attained after the wall covering has been repositioned as desired.

BACKGROUND OF THE INVENTION

Wall covering is adhered to walls, ceilings or other surfaces, by the use of an adhesive. Decorative sheet material such as wall coverings are formed typically of paper, plastic, metal foil, or fabric material having a pattern or design printed or embossed on the front surface, with the other surface, or back, being coated with the adhesive. Other types of wall coverings include those having a plastic decorative surface and a backing of woven or non-woven fabric or paper.

Some wall coverings adhere to walls by virtue of wet glue, cement or the like (typically known as "wallpaper paste") applied to the wall or wall covering before hanging. Typically, the backing or back surface is adapted to be coated by the user with the aforementioned wallpaper paste to secure the wall covering to a surface. However, consumers dislike the inconvenience of mixing and applying the paste. Other wall coverings are pasted. The paste of prepasted wall coverings is wetted before hanging the wall covering. However, prepasted wall coverings need a water pan, and this can be messy. Pressure sensitive adhesives (PSA) may be employed in place of the paste. PSAs have the advantage that they avoid employing wet paste. However, PSA do not allow the wall covering to be easily repositioned and aligned. It would be advantageous to provide an easily repositionable and alignable wall covering which employs PSA.

Generally, conventional wall coverings, which employ paste, permit the wall covering to be shifted or adjusted, after application to a surface, to a limited degree until the adhesive paste cures, or dries. In contrast to paste, PSAs rely on high initial tack and/or quick set-up reaction, or cure time for prompt or instant adhesion. Thus, PSAs with sufficiently high tack to hold a wall covering in place make it very difficult to apply a wallpaper to a wall and then reposition the wallpaper, as occurs for example, while matching up patterns from one wallpaper strip to the next. Although suitable pressure sensitive adhesives have in the past been applied to wall coverings, attempts to reposition those same wall coverings generally have not met with success. Typically, wall coverings having PSA have fallen from the walls to which they were applied shortly after such application due to poor permanent adhesion. Also, the wall covering cannot be slid and repositioned while in contact with the wall due to adhesive tack. Various spacer means have been used to separate the adhesive from the wall in attempting to introduce some slip until a permanent adhesion is attained. However, the outline of such spacer means shows through the decorative face of the wall covering. It is also difficult to manufacture wall covering by placing spacer means having the proper thickness or position over an adhesive coating.

The following references are illustrative of the prior art.

U.S. Pat. No. 3,301,741, Henrickson et al discloses a self-adhering wall covering comprising: a substrate, such as paper; a pressure sensitive adhesive; and a separation means secured to or a part of the back side of the substrate. The spacer means are of a uniformly pebbly contour of raised adhesive protrusions on the back separated by intervening adhesive planar areas wherein the tips of the protrusions are of a friable non-adhesive material which crumble into particles upon the application of pressure to the substrate. Also, the tips of the adhesive projections can be coated with a non-adhesive coating.

U.S. Pat. No. 5,141,790, Calhoun et al discloses a repositionable PSA sheet wherein the PSA has clumps thereon with non-adherent material distributed on the clumps.

OBJECTS OF THE INVENTION

It is an object of the present invention to provide a method for making a repositionable PSA decorative sheet, such as a wall covering or the like, that avoids the disadvantages and defects of the prior art.

Another object of the present invention is to provide an intermediate from which a repositionable PSA decorative sheet, such as a wall covering or the like, is made, wherein the intermediate has a fabric, polymer film or paper substrate having a PSA coating, a release layer and a dried non-sticky or non-tacky ink pattern on the release layer.

Various other objects, advantages, and features of this invention will be readily apparent from the following detailed description and appended claims.

SUMMARY OF THE INVENTION

The present invention provides methods for making a repositionable PSA—backed decorative sheet, i.e., substrate, having a decorative front side and a back side. A first embodiment of the methods of the present invention includes applying a release layer onto the decorative front side. The release layer may be a release coating or a release sheet. Thus, a back side of the release layer contacts the decorative side. Then, a pattern of spacers of ink is printed on a front side of the release layer. This covers a portion of the release layer front side with the ink spacers. After printing, the ink pattern dries to become non-sticky or non-tacky. The back side of the decorative sheet is coated with PSA. Then the decorative sheet having the release layer and spacers on one side and PSA on its other side is rolled up to form a roll. This causes the spacers and release layer to contact the PSA. Neither the dried ink spacers nor the release layer are sticky or tacky. Thus, the ink spacers permanently adhere to the PSA and when the roll is unrolled the spacers transfer from the release layer to the PSA. The transfer of the spacers is an important aspect of this embodiment. The height (thickness) of the ink spacers, and surface covered by the ink spacers are sufficient for partially and temporarily maintaining a separation or slight contact between the PSA and a wall, or other substrate to be covered, while the ink spacers contact and are moved along the wall or substrate. When the sheet is properly positioned, then pressure is applied on the decorative side to cause the adhesive to anchor to the wall.

The present invention also includes a first embodiment of an intermediate product from which a repositionable PSA—backed decorative sheet is produced. The intermediate may be made by the above mentioned method. Thus, the release layer back side contacts the decorative front side of the above mentioned decorative sheet. The non-sticky ink pattern of spacers covers a portion of the release layer front side. The PSA covers the back side of the decorative sheet. When this intermediate is rolled up into a roll, the pattern contacts the PSA and, upon unrolling, transfers from the release layer to the PSA.

The present invention also includes embodiments of methods for making a self-adhesive decorative sheet having a decorative front side and an adhesive back side. The methods include providing a release sheet; printing a pattern of spacers to cover a first portion of a first side of the release sheet; drying the ink to make it non-sticking; and then either coating PSA onto the first side of the release sheet or onto the decorative sheet. Then, the decorative sheet and release sheet are brought together with the PSA and the non-sticky spacers therebetween.

The present invention also includes other embodiments of an intermediate product from which a repositionable PSA—backed decorative sheet is produced. The intermediates comprise a release sheet having a flat surface; ink spacers releasably attached to the flat surface of the release sheet; and an adhesive layer in contact with the ink spacers and the release sheet.

The above methods and intermediates have the substantial advantage that they avoid printing the pattern of ink spacers directly on PSA. This avoids problems, such as jamming, resulting from printing directly on PSA.

Moreover, the present invention results in an easy to use PSA—backed decorative sheet which can be repositioned by sliding the surface of the pattern across the wall surface until a desired location is achieved. Then by applying sufficient pressure to the outer decorated surface, the separation created by the pattern between the PSA and the wall is overcome and the PSA, not otherwise in contact with the wall, contacts and adheres to the wall. Thus, a wall covering is provided which can slide freely against the surface of the wall and which develops additional tack after pressure is applied. By "wall" herein is meant a wall or partition as in a room or on the inside or outside of a building. However, "wall" shall also mean herein any solid surface which can receive a PSA—backed decorative sheet, including and not by way of limitation, cabinets, doors, floors, ceilings, shelves, signs, fences, billboards, automotive vehicle siding, window, stationary, drawers, borders, waste baskets, lamps, pictures, movable paneling, etc.

BRIEF DESCRIPTION OF THE DRAWINGS

The following detailed description are given by way of example and are not intended to limit the present invention which will be better understood in conjunction with the following drawings in which.

DETAILED DESCRIPTION OF THE INVENTION

Figure 1:
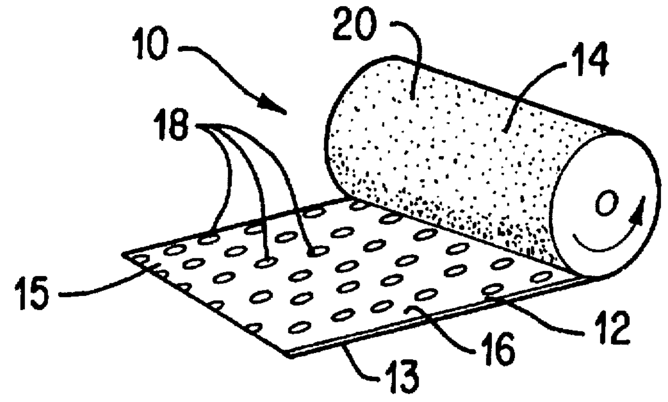
FIG. 1 is a perspective view of a first preferred embodiment of a roll of a decorative sheet having a release coat and made by a method of the present invention.
Figure 2A:
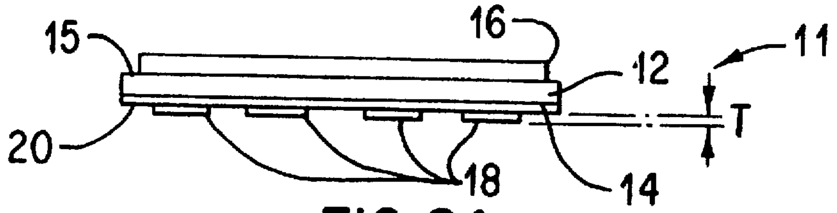
FIG. 2A is a side view of an intermediate of the present invention employed to make the roll of FIG. 1.
Figure 2B:
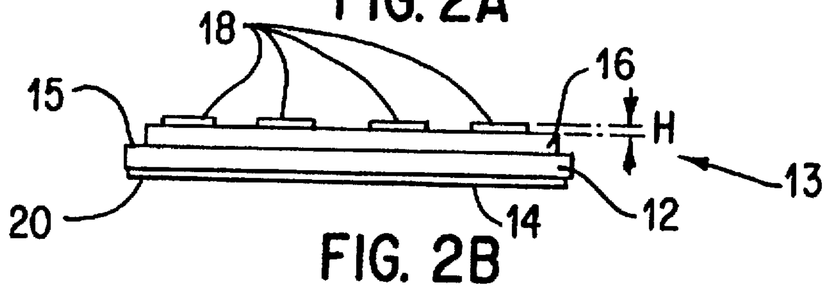
FIG. 2B is a side view of the decorative sheet of FIG. 1.

In the present figures and specification, where like elements are identified by like numerals, FIGS. 1, 2A and 2B shows various views of a first embodiment of the present invention. FIG. 1 shows a perspective view of a roll 10 of a finished self-wound/self-adhesive decorative wall covering produced according to the method of the present invention. FIG. 2A shows a portion 11 of an intermediate of the wall covering prior to final winding as the roll 10. FIG. 2B shows a side view of a portion 13 of the wall covering of the present invention unrolled from roll 10. FIG. 1 also shows this portion 13. As shown by FIGS. 1, 2A and 2B, the wall covering of the present invention comprises a substrate 12 having a decorative side 14 and a working, or back, side 15, an adhesive coating 16, a pattern of non-adhesive spacers 18 and a release coating 20. The spacers 18 have a thickness "T" (FIG. 2A) which is the same or slightly larger than its height "H" (FIG. 2B) above the adhesive coating 16. FIG. 2A, shows the portion 11 of the intermediate product wherein the adhesive coating 16 is on the working side of the substrate 12 and the release coating 20 is on the decorative side of the substrate 12.

The pattern of non-adhesive spacers 18 is applied over the release coating 20. The spacers 18 are initially printed as wet ink onto the release coating 20 and adhere to the release layer. When the ink dries the spacers releasably adhere to the release coating 20.

Thus, prior to rolling, the spacers 18 and adhesive coating 18 are on opposite faces of the wall covering. However, upon rolling of the wall covering to form the roll 10, the spacers 18 contact the adhesive coating 16. The adhesiveness of the adhesive coating 16 is much stronger than the minor adhesion between the spacers 18 and the release layer. Thus, as shown by FIGS. 1 and 2B, after rolling, the pattern of non-adhesive spacers 18 transfers from the release coating 20 to the adhesive coating 16.

The substrate 12 comprises a decorative, printed or embossed decorative sheet having the decorative front side 14. The decorative front side 14 is typically fabric, metal foil, polymer film, such as vinyl, i.e., polyvinyl chloride, polyester, cellulosic material, such as but not limited to paper, and combinations thereof. The adhesive coating 16 is a tacky PSA (pressure sensitive adhesive) layer which is applied to the back or working side 15 of the substrate 12. The adhesive coating 16 covers all or a portion of the back or working side 15. As explained below, the embodiment of FIG. 1 has its release coating 20 applied as a thin film coating. In the alternative, a release sheet, described below (See FIG. 4), could be employed.

The non-adhesive spacers 18 are applied as a pattern of circles as shown by FIG. 1. However, the spacers 18 may be of any geometric shape, e.g., square, diamonds, triangles, or ovals. The spacers 18 are comprised of an ink which, after drying, releasably adheres to the upper surface of the release coating 20. Inks that releasably adhere to the release coating are any number of conventional inks as described elsewhere in the present specification. The transfer of the spacers 18 from the release coating 20 to the adhesive coating 16 results because the adhesive coating 16 exerts greater adhesive force on the spacers 18 than does the release coating 20. This greater adhesive force, rather than the type of ink is more of controlling factor permitting the transfer of the spacers 18.

The present invention has the substantial advantage that it avoids printing directly over the pressure sentsitive adhesive. Such printing directly over the adhesive is avoided because such adhesive would stick to the printing device and rollers.

Figure 3:
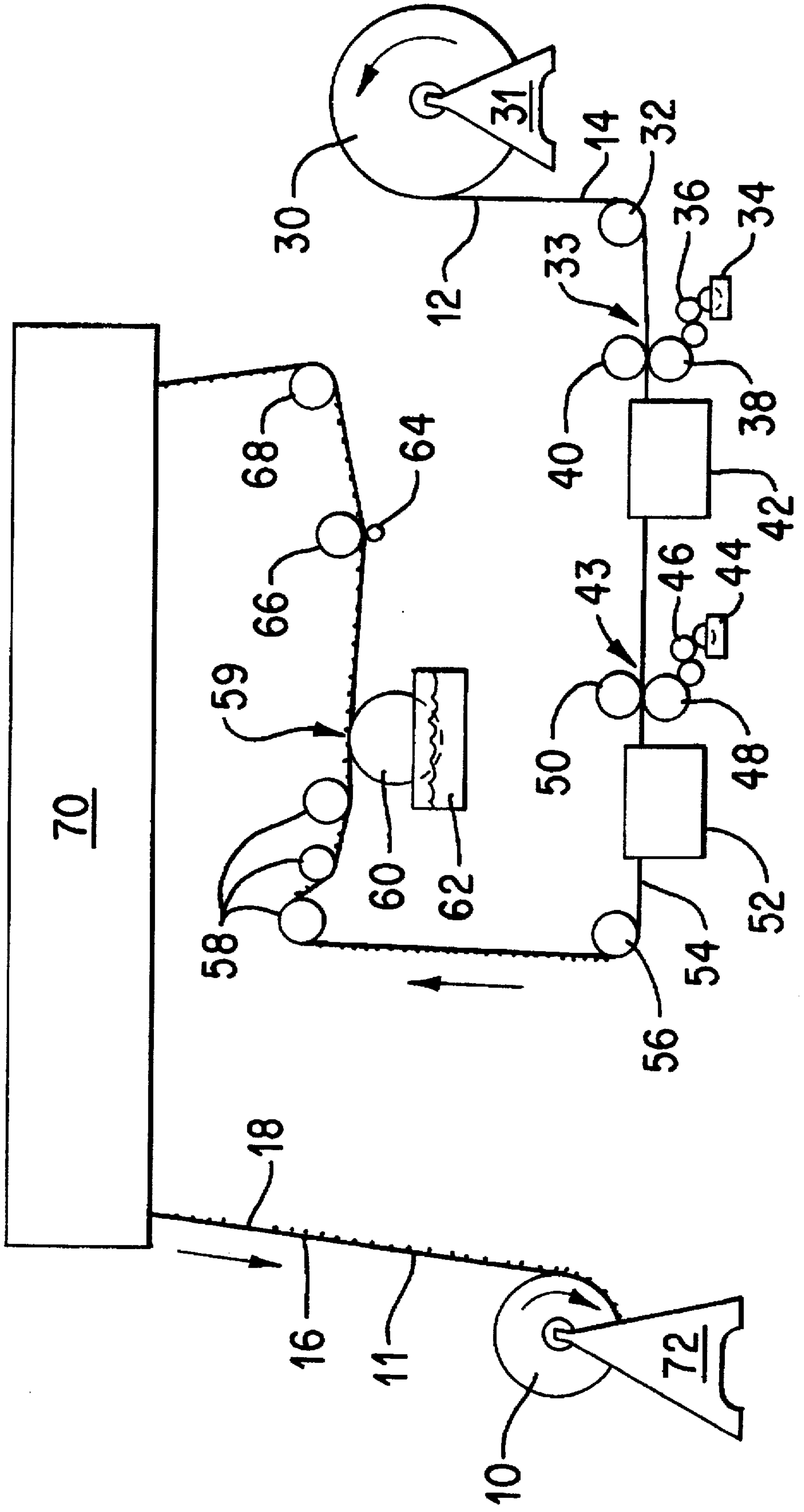
FIG. 3 shows a schematic of an apparatus for making the roll of FIG. 1.

FIG. 3 shows an apparatus for performing a first embodiment of the method of the present invention to make the roll 10 of FIG. 1. A preprinted roll 30 of substrate 12 unrolls from an unwind stand 31 and passes along a roller 32 and feeds a coating station 33. At coating station 33, the substrate 12 passes between a backup roller 40 and release coating applying roller 38. Release coating applying roller 38 applies release coating 20 to coat the decorative side 14 of the substrate 12. The material for coating 20 passes from a release coating reservoir 34, through a series of release coating feed rollers 36, to the applying roller 38. The substrate 12 then proceeds through a dryer 42 where the release coating 20 is dried. After drying, the substrate 12 passes to a printing station 43. At the printing station 43, ink from an ink reservoir 44 is fed through a series of ink feed rollers 46 to an ink applying roller 48. The substrate 12 passes between a backup roller 50 and the ink applying print roller 48 which applied the pattern of spacers 18 to the release coating 20. The substrate 12 then passes through a dryer 52 to dry the ink of the spacers 18.

The substrate 12 then passes along a roller 56 and a series of rollers 58 to an adhesive applying station 59 which applies adhesive coating 16 to the back side 15 of the substrate 12. Station 59 comprises an adhesive applying roller 60 which is supplied with adhesive from an adhesive trough 62. The adhesive applying roller 60 contacts the back side 15 of the substrate 12 to apply the adhesive coating 16. The substrate 12 then passes between a wire wound metering rod 64 as well as a backup roller 66 and then along a roller 68 to feed a dryer 70. The intermediate 11 of the wall covering is then discharged from the dryer 70 and wound at wall covering rewind station 72 to form the roll 10 of finished self-wound/self-adhesive decorative wall covering. As the intermediate 11 rolls onto roll 10, the pattern of spacers 18 contacts and adheres to the adhesive coating 16. Thus, the spacers 18 transfer from the release coating 20 (as shown on FIG. 2A) to the adhesive coating 16 (as shown on FIG. 2B) upon unrolling of the roll 10.

Figure 4B:
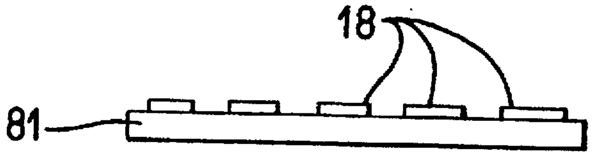
FIG. 4B is a side view of a release sheet with spacers printed thereon made by the apparatus of FIG. 4A.
Figure 4C:
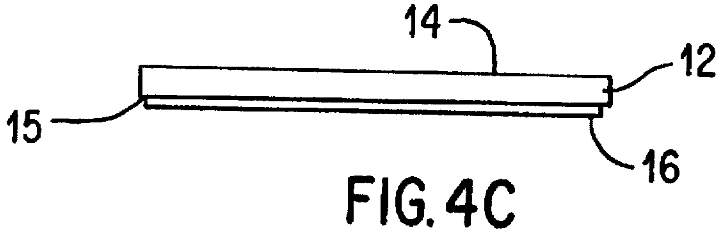
FIG. 4C is a side view of a PSA coated decorative sheet made by the apparatus of FIG. 4A.
Figure 4A:
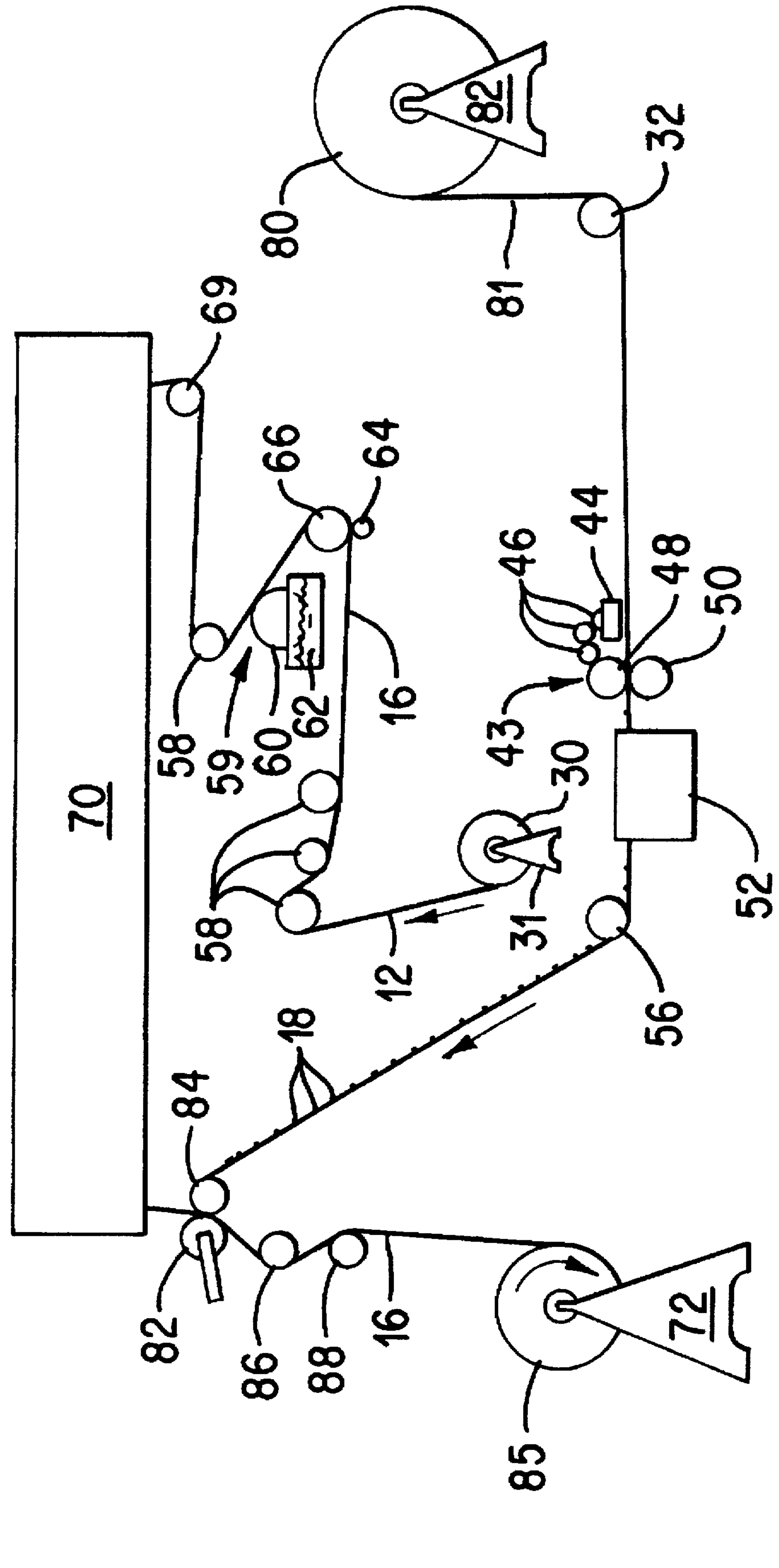
FIG. 4A shows a schematic of an apparatus for making a second embodiment of the present invention having a release sheet.

FIG. 4A shows a second embodiment of an apparatus for performing a method of producing a wall covering similar to that of FIGS. 1, 2A and 2B. The embodiment of FIG. 4 substitutes a release sheet 81 for the release coating 20 of FIGS. 1, 2A and 2B. In the apparatus of FIG. 4, a roll 80 of the release sheet 81, e.g., sheet of release coated paper, is fed from an unwind stand 82 to the printing station 43 where spacers 18 are applied. Then, sheet 81 passes through a dryer 52. The roll 30 of substrate 12 is fed to the first of the series of rollers 58 and then passes to the adhesive applying station 59, over rollers 68, 69 and into the dryer 70. After passing dryer 70, the substrate 12 and the release sheet 81 are put together by a rubber nip pressure roller 82 and a cooling can 84. Then the combined substrate 12 and sheet 81 pass over another cooling can 86 and a roller 88 and is wound on a roll 85 at the wall covering rewind station 72.

Figure 4D:
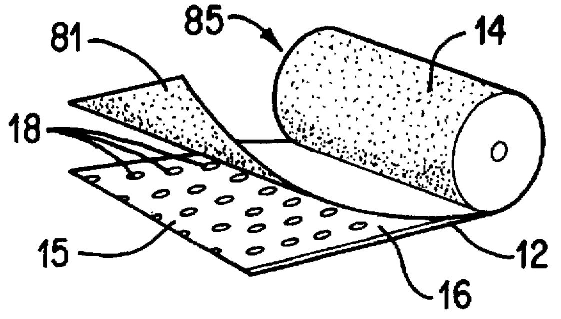
FIG. 4D is a perspective view of a roll of a decorative sheet having a release layer and made by the apparatus of FIG. 4A.

FIG. 4B shows a side view of the release sheet 81 having spacers 18 as it is discharged from the printing station 43. FIG. 4C shows a side view of the decorative wall covering 12 having a decorative side 14 and having PSA 16 coated onto its working side 15 as it is discharged from the adhesive applying station 59. FIG. 4D shows the roll 85, made by the apparatus of FIG. 4A, with a portion of the release sheet 81 peeled away from substrate 12 to show the PSA 16 and spacers 18.

Figure 5:
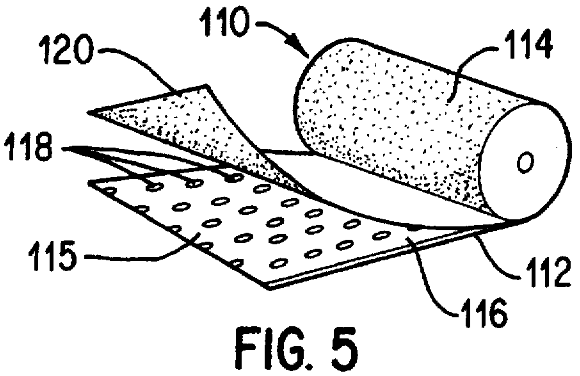
FIG. 5 is a perspective view of a third preferred embodiment of a roll of a decorative sheet having a release sheet and made by a method of the present invention.
Figure 6A:
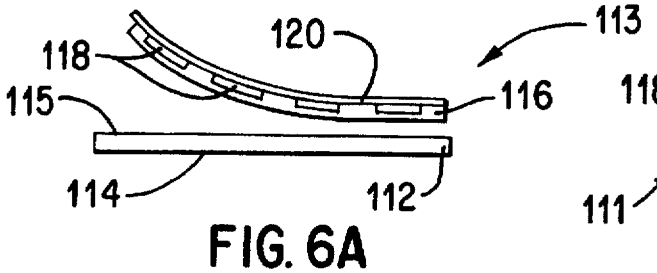
FIG. 6A is a side view of an intermediate of the present invention employed to make the roll of FIG. 5.
Figure 6B:
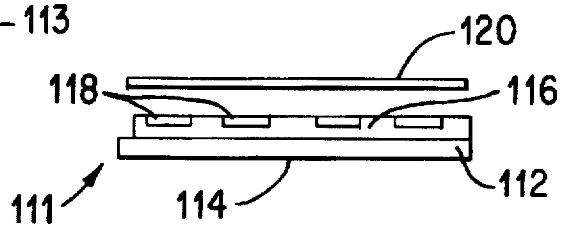
FIG. 6B is a partially exploded side view of the decorative sheet of FIG. 5.

FIGS. 5, 6A and 6B show various views of another embodiment of wall covering of the present invention. FIG. 5 shows a roll 110 of wall covering made according to the present invention. The roll 110 comprises a substrate 112 and a release sheet 120, e.g., a sheet of release coated paper. The substrate 112 has a decorative side 114 and a working or back side 115. An adhesive coating 116 is located on the working side 115.

As shown by FIG. 6A, prior to joining the adhesive coating 116 to the substrate 112, the adhesive coating 116, and a pattern of non-adhesive spacers 118, are attached to the release sheet 120. To make embodiment 113 of FIG. 6A, the pattern of spacers 118 is printed onto a first flat side of the release sheet 120 to cover a first portion of the first side of the release sheet 120 and protrude from the release sheet 120 first side, as well as define a second portion of the first side of the release sheet 120 which is uncovered by the spacers 118. Then, the adhesive coating 116 is coated directly onto the spacers 118 and the second portion of the release sheet. Then the adhesive coating 116 is adhered to the back side 115 of the substrate 112 with the release sheet 120, releasably attached to the adhesive coating 116 (as shown in FIGS. 5 and 6B). The non-adhesive spacers 118 are made of dried ink. After the adhesive coating 116 is attached to the substrate 112, the wall covering is rolled to form the finished roll 110. When it is desired to use the wall covering of roll 110, the roll 110 is unrolled, a portion of the wall covering is cut away from the roll 110 and the release sheet 120 is removed from the cut away portion of the wall covering as shown by FIG. 6B. Then the cut away portion of the wall covering is attached to the wall.

Figure 7:
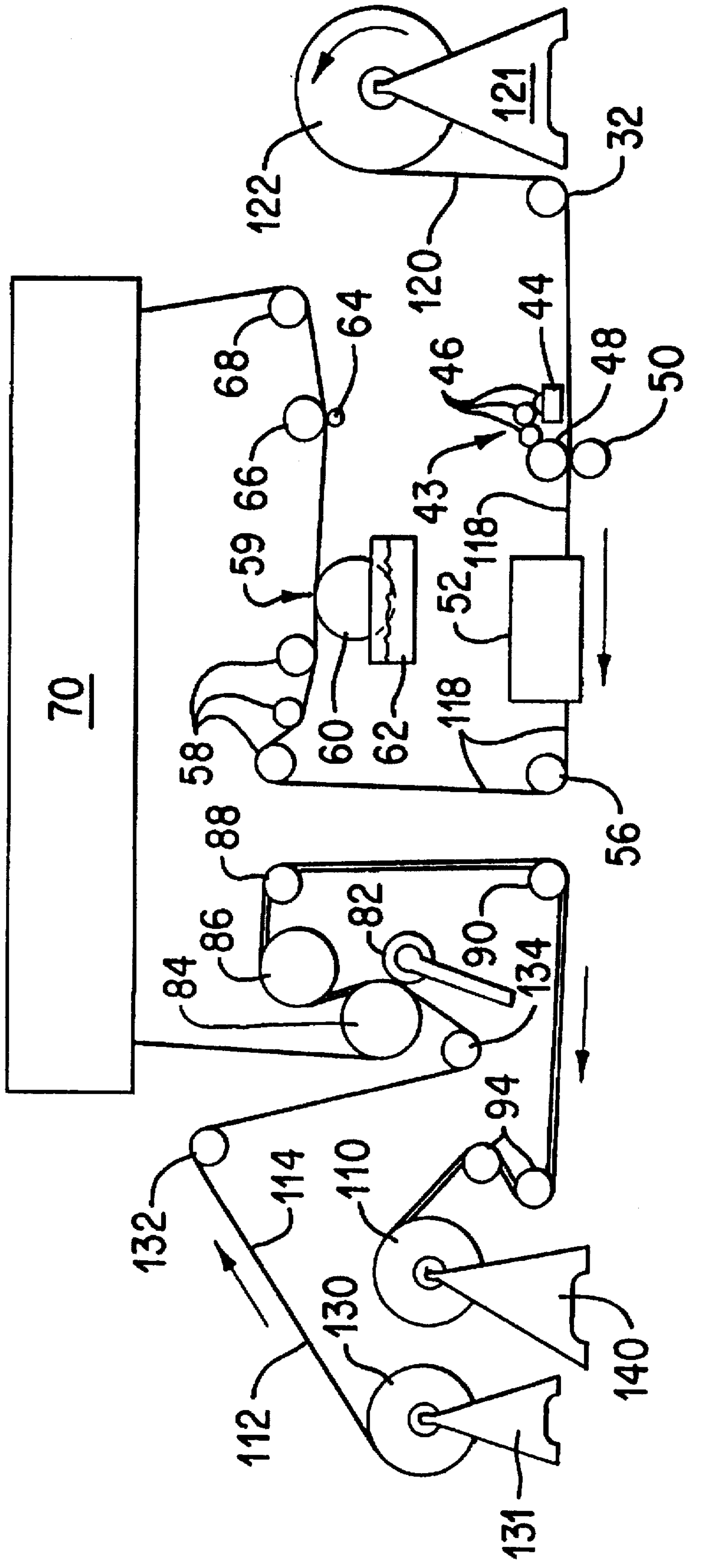
FIG. 7 shows a schematic of an apparatus for making the roll of FIG. 5.

FIG. 7 shows an apparatus for performing a method of making the roll 110 of FIG. 5. A roll 122 of the release sheet 120 is unwound from an unwind station 121 and passes across the roller 32, through the printing station 43 and into the oven 52 which drys the ink spacers 118 applied at the printing station 43. It is noted that the spacers 118 are applied to a surface of the release sheet 120 which is flat, i.e., it has no surface irregularities such as dimples or protrusions. Thus, the printed ink spacers 118 protrude from the flat surface of the release sheet 120.

The release sheet 120 then passes along the roller 56 and rollers 58 to the adhesive applying station 59 which applies the adhesive coating 116 over the spacers 118 and the majority of the remainder of the side of the release sheet 120 upon which the spacers 118 are printed. FIG. 6A shows in detail this arrangement of spacers 118, adhesive coating 116 and release sheet 120. The release sheet 120 passes between the wire wound metering rod 64 and backup roller 66 and then passes the roller 68 and into the dryer 70 where the adhesive coating 116 is dried. The release sheet 120 exits from the dryer 70 and passes between the cooling can 84 and the rubber nip pressure roller 82 where it is layered together with the substrate 112. The substrate 112 is provided by unrolling a roll 130 of substrate 112 at an unwind station 131, and then passing the substrate 112 along rollers 132, 134 to between the cooling can 84 and roller 82. The combined sheets of release sheet 120 and substrate 112 then pass along another cooling can 86, rollers 88, 90 and 94 and are collected as the roll 110 at a rewinding station 140.

It is noted that the various rollers and rolls of FIGS. 3, 4A and 7 are turned by conventional means known in the art. The pattern of spacers is placed by flexographic printing in the embodiments of FIGS. 3, 4A and 7. However, other methods of placing the spacers may be employed as discussed elsewhere in the present specification. The rollers of FIGS. 3, 4A and 7 which contact adhesive or the pattern of spacers are coated with polytetrafluroethylene or siliconized rubber. The remaining rollers of FIGS. 3, 4A and 7 are typically coated with rubber. The dryers of FIGS. 3, 4A and 7 may be convection ovens, ultraviolet light ovens, infrared light ovens, or hot air ovens conventionally known in the art.

The Substrate of the Decorative Sheet

The substrate of the decorative sheet can be, without limitation, any natural or synthetic cloth fabric, plastic, paper, or paper-like material, copolymer, laminate, metallic foil, or the like or combination thereof, which can be manufactured in a layer, sheet, web or film. The substrate may be printed upon, embossed, or otherwise decorated on at least its decorative front side. Also, its back side is printable. This substrate can include, for example, wall coverings, billboard advertising, home and commercial decorations and the like. There is no limitation on the thickness of the substrate. Preferably, the substrate is flexible so that it adjusts to the contour of slight projections or dimples on the underlying wall to which it is applied even though at times such underlying surface imperfections may not be visible from the decorative front side of the substrate, respectively after it is applied to the wall. The sheet material of the substrate can be produced by any manufacturing technique known to those skilled in the art including, and not by way of limitation, extruding, co-extruding, molding and blow molding, sheeting, rolling, stamping, calendaring, laminating, or by the use of paper or foil making machines and the like.

The substrate is sufficiently colored, patterned, printed or embossed to be at least opaque and preferably not transmissive. Thus, the pattern of spacers on the back side of the substrate are not visible through the decorative front side. Particularly, preferred decorative surfaces are manufactured from paper, embossed paper and vinyl film.

The Pressure Sensitive Adhesive (PSA)

The PSA, of the decorative sheet, useful in the present invention can be any adhesive known to those in the industry provided it exhibits sufficient initial tackiness to cause the decorative sheet to aggressively adhere to the wall.

It is a dry adhesive, as opposed to a wet paste. Of the preferred elastomeric-type PSA, many chemical compositions are known to those skilled in the art and without limitation these are useful in the present invention. Thus, for example, elastomeric-type PSAs comprising natural rubber, reclaimed rubber, styrene-isoprene-styrene rubber, butadiene-acrylonitrile rubber, polyvinylether rubber, styrene-butadiene-styrene rubber, butyl rubber, polyisobutylene rubber, nitrile rubber, styrene-butadiene rubber, polyurethane, polysulfide, polyesters, silicone resins and gums, neoprene rubber, acrylic, methacrylic, polyacrylate ester rubber, vinyl and mixtures thereof are useful in the present invention.

Room temperature curing PSAs are predominately based on the use of metal chelates or di-isocynates to obtain cross-linking.

Particularly preferred herein as PSAs compositions comprising silicone, including copolymers comprised of vinylidene fluoride and/or tetrafluoroethylene with organopolysiloxane and an organohydrogenpolysiloxane. Silicone PSAs have good thermal resistance, cold resistance, chemical resistance, electrical insulating properties, and controllable tack. Hence they are used for extensive purposes. Silicone cross-linking agents for optional use herein include organic peroxides and alkoxysilanes.

Preferred organic PSAs herein are the acrylate adhesives, which are normally a copolymer of a higher alkyl acrylate, such as 2-ethyl hexyl acrylate, copolymerized with a small amount of a polar comonomer. Suitable comonomers include acrylic acid, acrylamide, maleic anhydride, diacetone acrylamide, and long chain alkyl acrylamide. Additional preferred organic PSAs include polyvinyl acetate, vinyl acetate copolymers including comonomers of acrylate and maleate or ethylene, and acrylics.

The silicone adhesive and/or organic adhesive may be applied to the printed substrate solventless or from solution or emulsion.

Solution application of the PSA to the back of the decorative layer requires only an amount of solvent that is capable of dissolving the adhesive. Such solvents are preferably non-polar and include toluene, dimethyl ether, xylene, etc. Aromatic solvents are preferred. Aqueous emulsions of PSA without organic solvent are even more preferred herein. Typically, a solventless silicone PSA can be prepared with a viscosity of from 100 to 100,000 centipoise at 25° C. An organic solvent is typically used when the polydiorganosiloxane has a viscosity of at least one millon centipoise, a so-called silicone gum.

The solvent should not have such a low vapor pressure that it is difficult to remove from the adhesive in a drying process. If the solvent is too difficult to remove then phase separation may occur following precipitation but prior to complete solvent removal.

Adhesive emulsions or solutions for application to the back of the decorative sheet generally contain from about 10 to 400 parts by weight of adhesive solids, i.e., micelles of adhesive or solute, for each 100 parts by weight water or organic solvent. Preferably, the solids should range from about 15 to about 200 parts by weight and more preferably from about 20 to about 100 parts by weight for each 100 parts by weight of water or organic solvent.

Following application and drying of the PSA, the adhesive can be cross-linked as needed. Where an alkoxysilane is utilized as the cross-linking agent, cross-linking will occur by simply exposing the composite to atmospheric moisture. Heating may be used to speed the cure. However, where a peroxide cross-linking agent is utilized, then a heat cure is often necessary. Thus, the PSA must be exposed to temperatures ranging from about 80° C. to about 200° C. for time varying between about 30 seconds to about 1 hour. Persons skilled in the art are readily familiar with cross-linking these systems.

In a more preferred embodiment, the PSA is high solids, with little or no water or solvent.

The adhesive must be applied, to the back (or working) side of the decorative layer, in a layer thick enough to adhere to both smooth and rough surfaces. The thickness of the adhesive layer on the back is preferably about 0.00125 inch, i.e., 1.25 mils, but will generally vary from about one quarter of a mil to 2 mils or more. However, thicknesses of more than 2 mils are generally a waste of adhesive.

The Spacers or Separation Means

The spacers are projections that allow moving the decorative sheet, having a layer of PSA, along a wall or other surface at least initially after the decorative sheet is applied to the wall or other surface. The percent of back surface area occupied by the PSA as well as the percent of the back surface area occupied by the spacers, the thickness of the spacers, and their heights rising above the place of the adhesive surface are selected to allow the decorative sheet to be slidably movable on the surface of a wall to reposition the sheet and finally to be firmly attached to the wall by application of pressure on the decorative side of the sheet. The height and thickness of the spacers is sufficient to allow the PSA-backed wall covering to be moved while the spacers are in contact with the wall without a significant surface of the PSA contacting the wall. When the desired location for the wall covering is attained, increased pressure is applied on the decorative or front side of the wall covering. This causes slight deformation of the decorative sheet, compression of the spacers or a combination thereof sufficient to cause a significant area of the PSA to contact the wall surface to thereby firmly anchor the wall covering to the wall permanently.

The size, location, repeating design and surface area of the spacers can also be varied to match or register with the printed or embossed patterns on the face of the decorative sheet. In this manner, the noticeability of the spacers can be significantly reduced. The spacers on the back of the decorative sheet can be circles, diamonds, squares, ellipses, rectangles or other shapes, including irregular shapes such as wavy lines.

It is desirable to use spacers which protrude slightly a distance from the adhesive layer to minimize the deformation of the face of the decorative sheet when it is pressed to engage the PSA to the wall. The higher the spacers are above the adhesive layer, the more noticeable can be the strike through, i.e., the conspicuous visibility of the spacers or separation means on the decorative side of the wall covering after final adherence of the wall covering to a wall.

Typically, the spacers 18 of FIGS. 2B and 4B protrude a height "H" of about 0.05 to about 0.25 mils from the adhesive layer and have a thickness 'T' of about 0.05 mils to 0.50 mils. However, the spacers 118 of FIG. 6B are typically flush with the adhesive layer 116. The spacers 18, 118 cover from about 5 to about 50 percent of the surface area of the back of the decorative sheet. Preferably, about 5 to about 35 percent, more preferably about 20 to about 30 percent, of the surface area of the back of the decorative sheet is covered by the spacers. More adhesive area generally reduces the slip of the decorative sheet to much less. Less adhesive area can negatively impact adhesion to the wall.

Scrim and long strands generally provide strike through. One reason for this is that the scrim is often too thick and thus shows an imprint. If it is made thinner it is inoperable. The other and main reason is that it follows a continuous line pattern instead of being in the shape of spacers having a relatively small cross section and thickness. Normally, the wall has random bumps or dimples on its surface, but the scrim netting or straight strands are symmetrical and thus show up.

Figure 8A:
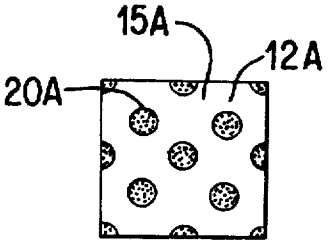
FIG. 8A shows a top view of a first portion of decorative sheet.
Figure 8B:
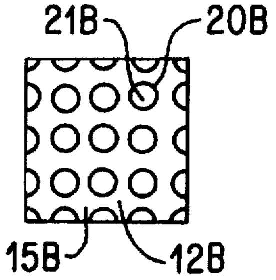
FIG. 8B shows a top view of a second portion of decorative sheet.

The cross section of each spacer will generally vary from about 0.01 to about 0.5 square inches, preferably 0.02 to 0.05 square inches, and particularly about 0.02 to 0.03 square inches. Typical spacers are shown in FIG. 8A and 8B. Spacers 20A of FIG. 8A covers about 0.4 square inches per square inch of a back side 15A of the decorative sheet 12A. Thus, about 0.6 square inches of adhesive 16A exposed. Each spacer 20A has an area of about 0.05 square inches and a diameter of about 0.25 inch. Spacers 20B of FIG. 8B cover about 0.35 square inches per square inch of the back side 15B of a decorative sheet 12B. Thus, about 0.7 square inches of adhesive 16B is exposed. Each spacer 20B has an area of about 0.02 square inches (not counting its hollow core 21B) and has a diameter of about 0.25 inches and a 0.19 inch wall thickness.

The spacers are preferably spaced so that there are about 720 to 2880 spacers per square foot of surface area on the back of the decorative sheet. This is equivalent to about 5 to about 20 spacers per square inch on the back of the decorative sheet. The spacers can be individual projections or a clump of closely spaced projections wherein the aforementioned dimensions refer collectively to each clump taken as a single spacer.

Anything that can be used as the ink on a printing machine can be used for fabricating the spacers so long as it is not sticky or tacky upon drying so that the spacers can slide over the surface of a wall. Thus, any plastic, including resinous material, which can be placed in solution, dispersion or emulsion and which is not sticky or tacky on drying can be used. The spacers can be made of organic polymeric material such as polyurethane, polyvinyl chloride, acrylic polymers, acetate, polyethylene, polypropylene or polystyrene and the like. Polyvinyl chloride resins, namely resins including up to about 20 weight percent of a comonomer along with the vinyl chloride, e.g., PVC homopolymers, co-polymers of PVC with acetate, PVC-acrylic blends and PVC plastisols are preferred raw materials for the spacers. Plastisol is a suspension. Non-plastisol PVC blends may be solutions. Spacers of such polymeric material generally possess some resiliency. Vinyl acrylic inks or plastisol inks are most preferred. The solvent or dispersing agent can be any one or a combination of conventional solvents, e.g. organic solvent or dispersing agents for plastic or resinous material such as mineral spirits, various esters, ketones, etc.

An expandable or foamable product, such as EXPANCEL® from Nobel Industries can be used as the spacers. Other deformable plastic foams can be selected from the group consisting of urethanes, polyvinylidene chloride, polyethylene, polypropylene, polystyrene, rubber lattices (natural and synthetic), and polyvinyl chloride. The decorative sheet of this embodiment will be able to slide along a wall as the foam contacts the wall surface, and without significantly contacting the PSA with the wall and yet can be permanently adhered by the application of sufficient pressure to deform the foam and thereby place the PSA in substantially full contact with the wall.

Placement of the Spacers and PSA on the Decorative Sheets

The PSA and spacers, i.e., projections, can be placed on the decorative sheets by various techniques although printing is the preferred method. Generally, the spacers are first printed in a pattern onto the release layer on the front side. Although any printing processes such as screen, gravure, flexographic, ink jet or lithographic printing can be used, flexographic printing is preferred. Screen printing can be flat screen (silk screen) or rotary screen. The rotary screen process is preferred since it lends itself to long production runs, allows for a controlled pattern or design, is capable or controlling the amounts of inks or adhesive, i.e., thickness or lay down rates, and is capable of in-register or side-by-side pattern printing. Another variation is to print the spacers on a transfer sheet and adhesive coat over these spacers and then transfer adhesive and spacers to the back of the substrate, i.e., wall covering.

Release Layer

At least when rolled up, the back side of the decorative sheet containing the PSA and the spacers contacts a suitable layer, e.g., coating or sheet. When the decorative sheet material is rolled up for storage purposes, the release layer prevents adhesion to the decorative surface of the sheet material. The release coating is permanently attached to the decorative sheet. In contrast, the release sheet can be removed, exposing the adhesive and projections, immediately prior to the decorative sheet material being applied to a support surface, e.g., wall.

The release layer also permits the transfer of ink from a surface of the release layer to the adhesive layer. If the ink had been printed directly onto the substrate, then it would not cleanly release and transfer to the adhesive layer. The release layer coated onto the substrate may be polyvinyl chloride or other appropriate polymer film. The release sheet may be made of siliconized formulations coated onto a layer of paper, or a polymer film such as polyvinyl chloride film.

To further demonstrate and explain the present invention, and not by way of limitation, the following example is presented.

EXAMPLE

In a preferred mode of placing the PSA and the spacers on a sheet of decorative paper as shown in FIG. 1, the paper is hung on an unwind stand. The paper has a decorative printed pattern on its face side and a silicone release top coat is applied over the decorative face side. The paper is then fed onto a creeper table that allows each roll to be spliced without shutting down the line. Next, the paper is conditioned in an oven that removes all excess moisture, and then into a tensioning device that controls the web tension through the printing process. Then, the paper passes through a print station and an adhesive applying station as in FIG. 3. The print station is a flexographic station in which the spacers are printed onto the release top coat of the paper. A printing roller that has a circle pattern protruding therefrom as shown in FIG. 3 is employed. Borden water based FLEXO-INK—available from Borden Packaging and Industrial Products (Div. of Borden, Inc.), Cincinnati, Ohio, is used at 200 cps to print the spacers. Press speed is 31 yards per minute. The FLEXO-INK height laid down is 0.20 mil (+ or −0.05 mils) dry. The spacers will cover about 30% of the surface of the release coat. After printing, the paper passes through an oven set at 300° F. The adhesive applying station coats the PSA on the back of the decorative sheet. The PSA has a viscosity of 3,000 cps. Typical PSAs include Daubert DC 7009EM, 3M 4224 NF, or other suitable adhesives. After applying adhesive, the paper passes through another oven set at 300° F. The spacer height above the adhesive layer is approximately 0.10 mil. Then the printed paper is wound into a master roll for later slitting and trimming to the proper width and length for use as a wall covering. Upon unwinding of the roll, the spacers transfer from the release coat to the adhesive layer to cover about 30% of the adhesive layer. The resulting wall covering will have excellent slidability, removeability and initial tack with no visual detection of the spacers after it is secured to the wall.

In use, an area adjacent an edge of the resulting wall covering is lightly brought in contact with a wall and then is slid on the wall surface on the projections for accurate positioning. Then pressure from a person's hand or a roller tool is employed to press the PSA into contacting the wall for permanent adhesion.

While specific embodiments of the method and product of the present invention have been shown and described, it should be apparent that many modifications can be made thereto without departing from the spirit and scope of the invention. Accordingly, the invention is not limited by the scope of the claims appended hereto.

What is claimed is:

1. A method for making a self-adhesive decorative sheet, having a decorative front side and a back side, comprising the steps of:
   applying a release layer having a release layer front side and a release layer back side onto the decorative front side of the decorative sheet such that the release layer back side contacts the decorative front side;
   printing a pattern of non-sticking ink spacers onto the release layer front side;
   coating a pressure sensitive adhesive coat onto the back side of the decorative sheet; and
   rolling up the decorative sheet so as to contact the release layer with the adhesive coat to transfer the spacers from the release layer to the adhesive coat.

2. The method of claim 1, wherein the release layer is coated onto the decorative front side to form a release coat.

3. The method of claim 1, wherein the release layer is a release sheet releasably applied onto the decorative front side.

4. The method of claim 1, wherein the pattern is printed onto the release layer by flexographic printing.

5. The method of claim 1, wherein the spacers comprise a material selected from the group consisting of polyurethane, polyvinyl chloride, acrylic polymer, acetate, polyethylene, polypropylene, polystyrene and physical or chemical mixtures thereof.

6. The method of claim 1, wherein the spacers comprise a material selected from the group consisting of polyvinyl chloride resins.

7. The method of claim 1, wherein the spacers each have a thickness in the range from about 0.05 mils to about 0.50 mils and protrude from the adhesive layer a height from about 0.05 mils to about 0.25 mils.

8. The method of claim 1, wherein the spacers cover about 5 to about 35% of the surface area of the release layer.

9. The method of claim 1, wherein the release layer comprises a material selected from the group consisting of polyvinyl chloride and silicone-containing composition coated on paper.

10. A method for making a self-adhesive decorative sheet having a decorative front side and a back side, comprising the steps of:
   providing a release sheet having a flat first side;
   printing a pattern of non-sticking ink spacers onto the release sheet to cover a first portion of the first side of the release sheet and protrude from the release sheet first side, as well as define a second portion of the release sheet first side which is uncovered by the spacers;

coating a pressure sensitive adhesive coating directly onto the back side of the decorative sheet; and directly adhering the pressure sensitive coating to the spacers and the second portion of the release sheet, wherein the release sheet is releasably attached to the pressure sensitive adhesive coating.

11. The method of claim 10, wherein the spacers comprise a material selected from the group consisting of polyurethane, polyvinyl chloride, acrylic polymer, acetate, polyethylene, polypropylene, polystyrene and physical or chemical mixtures thereof.

12. The method of claim 10, wherein the spacers cover about 5 to about 35% of the surface area of the release sheet.

13. The method of claim 10, wherein the release sheet comprises a material selected from the group consisting of polyvinyl chloride and silicone-containing composition coated on paper.

14. A method for making a self-adhesive decorative sheet having a decorative front side and a back side, comprising the steps of:

providing a release sheet having a flat first side;

printing a pattern of non-sticking ink spacers onto the flat first side of the release sheet to cover a first portion of the first side of the release sheet and protrude from the release sheet first side, as well as define a second portion of the first side of the release sheet which is uncovered by the spacers;

coating a pressure sensitive adhesive coating directly onto the spacers and directly onto the second portion of the release sheet; and adhering the pressure sensitive adhesive coating to the back side of the decorative sheet with the release sheet releasably attached to the pressure sensitive adhesive coating.

15. The method of claim 14, wherein the spacers comprise a material selected from the group consisting of polyurethane, polyvinyl chloride, acrylic polymer, acetate, polyethylene, polypropylene, polystyrene and physical or chemical mixtures thereof.

16. The method of claim 14, wherein the spacers comprise a material selected from the group consisting of polyvinyl chloride resins.

17. The method of claim 14, wherein the spacers cover about 5 to about 35% of the surface area of the release layer.

18. The method of claim 14, wherein the release sheet comprises a material selected from the group consisting of polyvinyl chloride and silicone-containing composition coated on paper prior to said printing of said pattern.

* * * * *